June 15, 1926.  
J. B. ARPIN  
HYDRAULIC SEPARATING MECHANISM  
Filed July 25, 1922  
1,588,689  
3 Sheets-Sheet 2
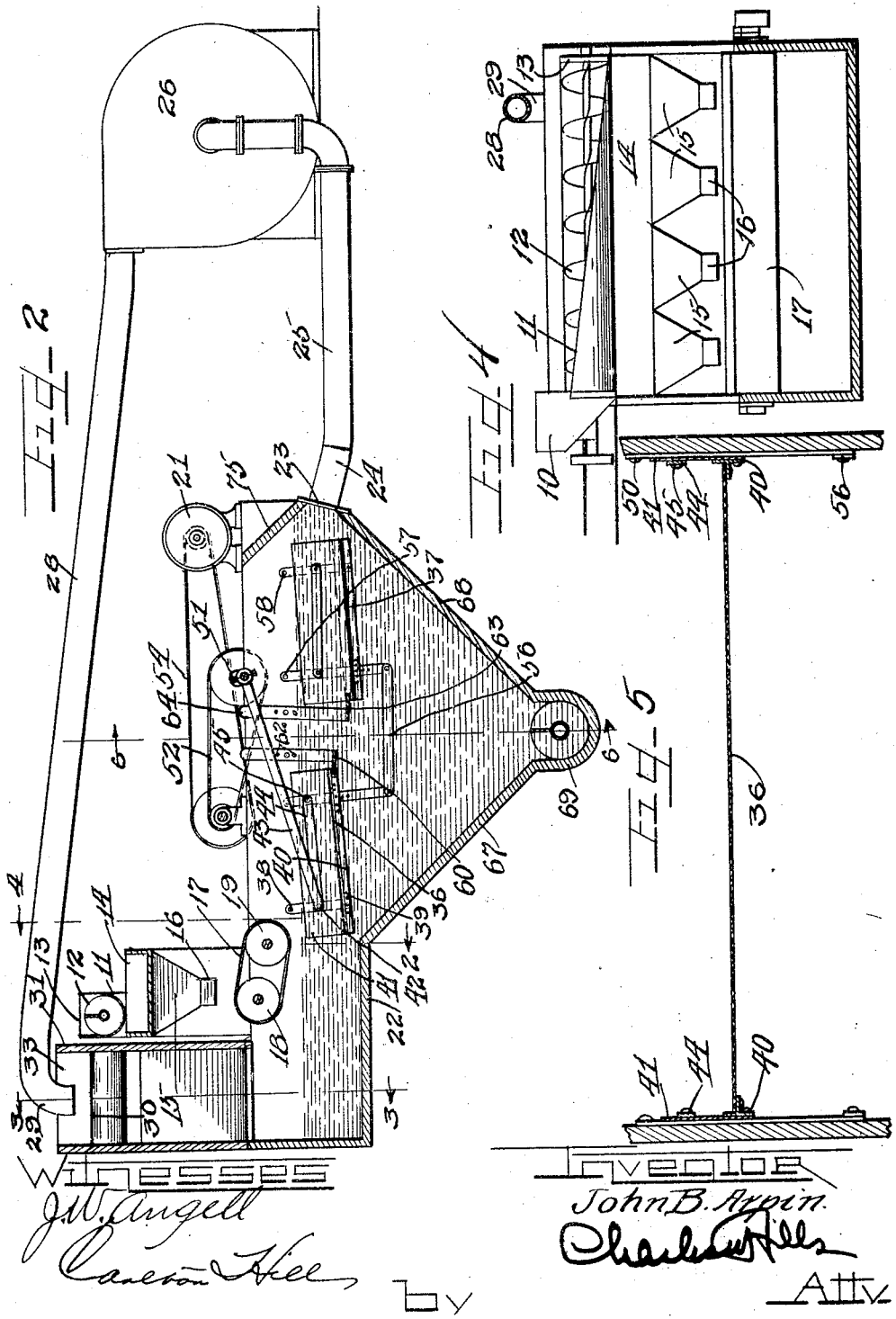

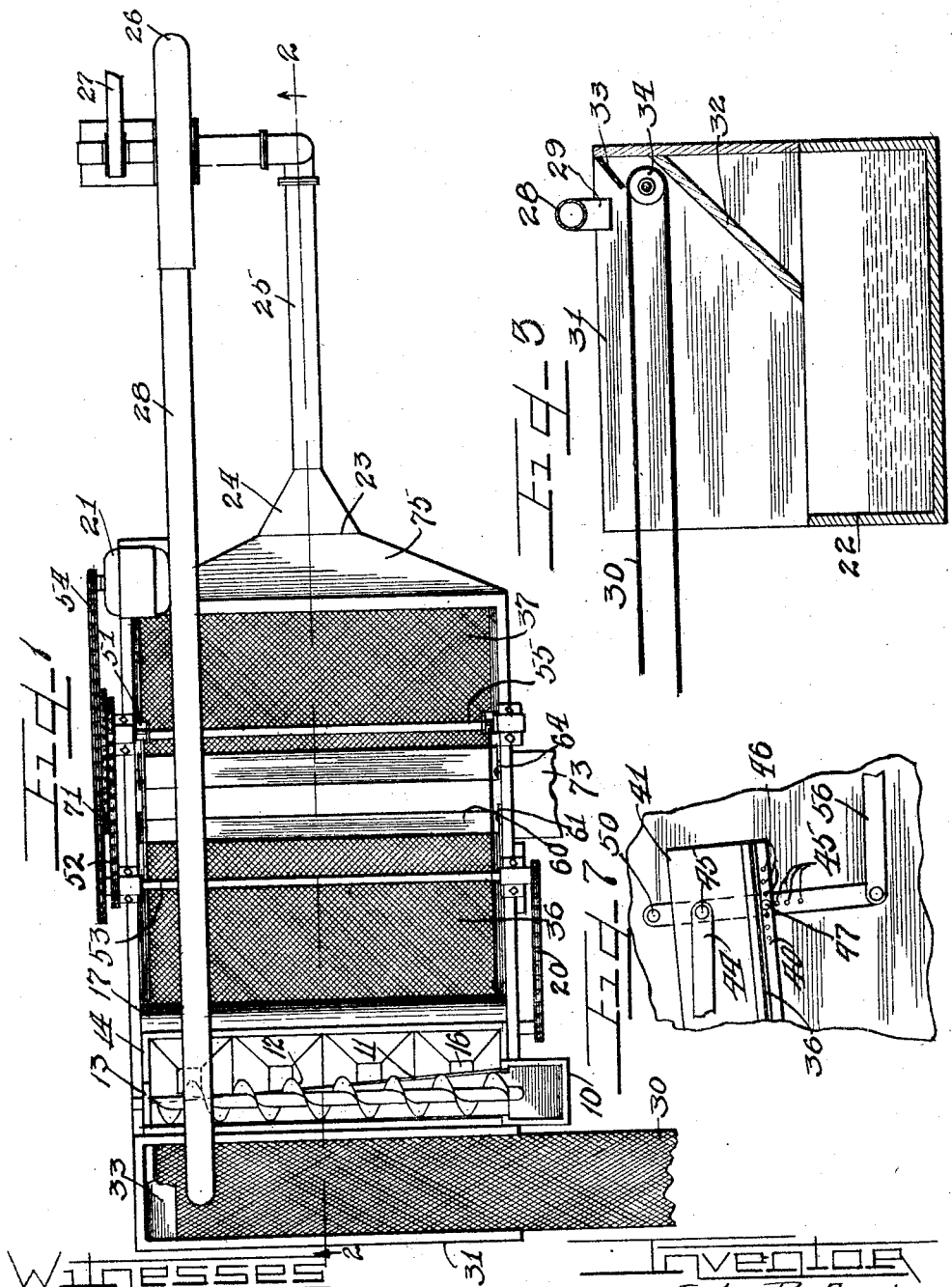

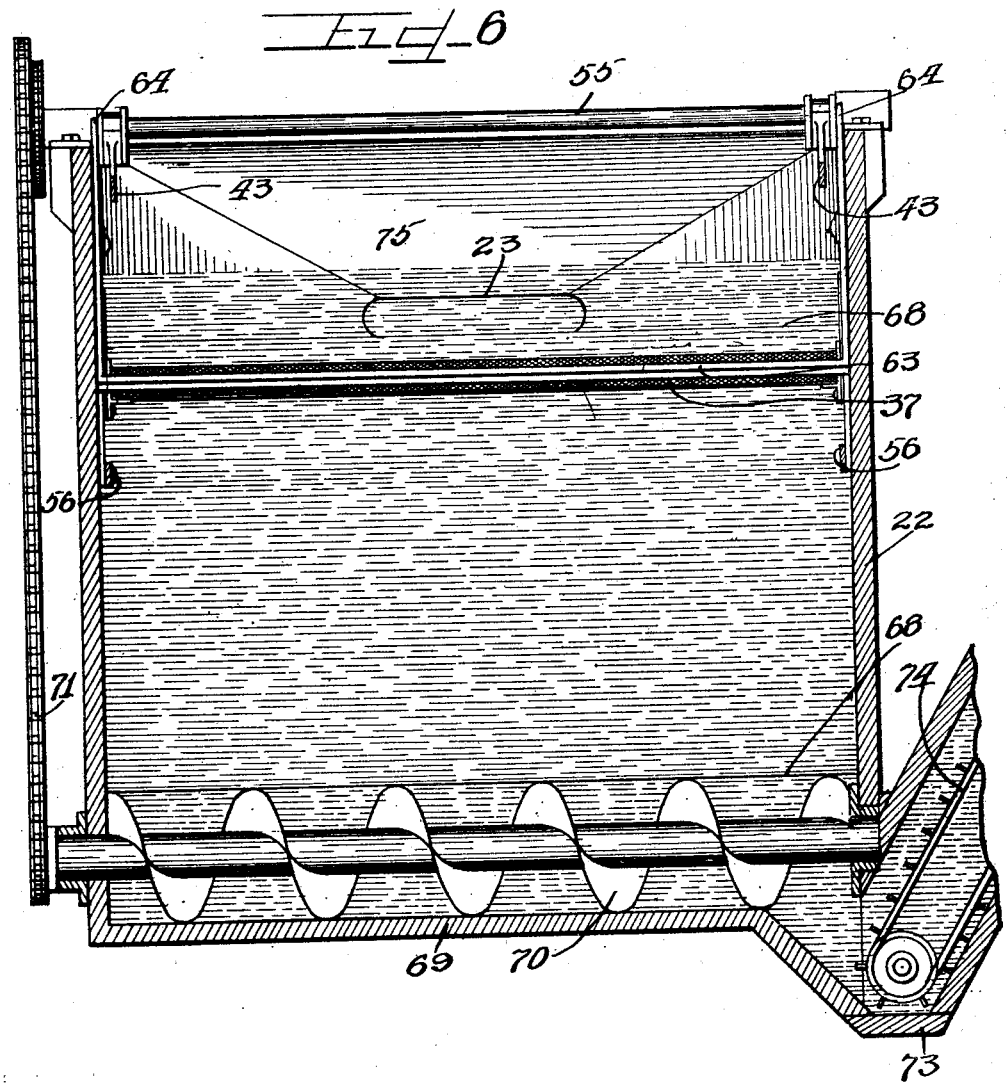

Patented June 15, 1926.

1,588,689

UNITED STATES PATENT OFFICE.

JOHN B. ARPIN, OF WISCONSIN RAPIDS, WISCONSIN.

HYDRAULIC SEPARATING MECHANISM.

Application filed July 25, 1922. Serial No. 577,310.

This invention relates to that class of devices which are used to separate a mixture of materials into several parts according to the coarseness and heaviness of the particles. In many such devices, the separation is effected by means of a stream of water in a flume. It is an object of the present invention to afford such a separation where the supply of water is too limited to make it possible to use a flume.

It is a further object of this invention to provide means for separating coke from ashes by means of a tank and a pump driven circulating system causing a stream of water across the tank.

It is a further object of this invention to provide means whereby a supply of ashes, dumped intermittently into a hopper, shall be converted into a wide steady stream of ashes delivered to the apparatus.

It is a further object of this invention to provide means for rapidly and effectively separating the reclaimed coke from the water which has been used in treating the ashes.

It is a further object of this invention to provide a simple and effective device for adjusting the slope and the degree of oscillation of the sieves.

Other and further important objects of this invention will be apparent from the drawings and specification.

The invention (in a preferred form) is illustrated on the drawings and hereinafter more fully described.

On the drawings:

Figure 1 is a top plan view of the apparatus.

Figure 2 is a view of the apparatus partly in side elevation and partly in section upon the line 2—2 of Figure 1.

Figure 3 is a section upon the line 3—3 of Figure 2.

Figure 4 is a section upon the line 4—4 of Figure 2.

Figure 5 is a section upon the line 5—5 of Figure 2.

Figure 6 is a section upon the line 6—6 of Figure 2.

Figure 7 is an enlarged detail view showing the mechanical connections adjacent one end of one of the sieves.

As shown on the drawings:

The apparatus has a hopper 10 into which the ashes to be separated are dumped. This hopper delivers into a trough 11 which contains a screw conveyor 12. The trough 11 at one side of the screw conveyor, the left-hand side as shown in Figures 1 and 2, extends to its full height, but on the other side it has an oblique upper edge descending from approximately full height at the hopper 10 to the level of the bottom of the screw conveyor at the other end of the trough. The end wall 13 of the trough extends to the full height of the left-hand side wall at the end toward which the conveyor moves the ashes. At the other end, the trough has no end wall in order that the hopper 10 may deliver into it.

Below the conveyor and trough is a receptacle 14 which is in the form of a long box having a number of bins 15 in the bottom thereof. Each of the bins tapers downward and ends in a delivery spout 16. These spouts deliver onto a belt conveyor 17. This conveyor is mounted upon a pair of rollers 18 and 19 so that its upper side moves toward the right in Figures 1 and 2. One of these rollers is driven by a sprocket chain 20 which is connected by intermediate connections, which will be described below, to an electric motor 21. The belt 17 carries the material from beneath the spouts 16 and delivers it into a tank 22.

This tank is filled with water to a height above the outlet 23. This outlet is connected by a funnel 24 and a pipe 25 to the suction side of a pump 26. Any form of pump may be used but a centrifugal pump is preferred as it is intended to handle a mixture of water and coke. The pump is driven by a belt 27 connected to any desired source of power. The delivery side of the pump is connected by a pipe 28 to a down-turned spout 29 which delivers onto a traveling screen 30. One end of this screen is located within a box 31 at the left of the bins 15 as seen in Figures 1 and 2. This box has no bottom but at the end thereof nearest the spout 29 it is provided with an apron 32 to guide the returning water. Above the traveling screen 30 a smaller apron 33 is provided which prevents the water coming from the spout 29 from splashing over the right-hand end of the traveling screen 30 as seen in Figure 3. At this end, the screen passes around a roller 34 and at the other end it passes around a second roller (not shown). At the last-named end, it delivers to any suitable storage place for the coke.

Within the tank 22, below and to the right as shown in Figures 1 and 2, of the belt conveyor 17 is located a sifting apparatus. This includes a pair of oscillating screens 36 and 37, each of which is mounted upon swinging levers. The left-hand one of these levers, as shown in Figure 2, is pivoted at 38 to the side wall of the tank. Its lower end is provided with a pin which is received in any one of a series of holes 39 in the flange 40 of the frame of the screen 36. The position of the attachment of the lever to the screen may be varied by placing this pin in any one of the holes 39. A wider flange 41 extends upward from the screen and a pivotal connection 42 extends through this wider flange and the lever. The same connection also goes through a pitman 43 and a link 44.

The link 44 is connected at its other end by a pivotal connection 45 which also goes through the wide flange 41 to a similar lever pivoted to the side wall of the tank at 50. This lever has a series of holes 45 and the flange 40 of the frame of the screen has a series of holes 46. This lever and the screen are adjustably connected by inserting a pin 47 in any selected pair of holes one in each of the series 45 and 46. These holes are made large enough to care for all lost motion.

The pitman 43 is connected to an eccentric 51 which is driven by a sprocket chain 52 from shaft 53. This shaft crosses the tank 22 and at its opposite side, the lower side in Figure 1, drives the sprocket chain 20 for running the belt conveyor 17. The shaft 53 in its turn is driven by a sprocket chain 54 which is directly connected to the motor 21. From the eccentric 51 a shaft 55 goes across the tank to a similar eccentric upon the opposite side which works through similar levers to oscillate the other side of the screen so that the two sides are moved together without any racking of the screen.

The lever pivoted at 50 extends below the holes 45 and at its lower end is connected by a link 56 to a lever pivoted to the side of the tank at 57 and supplied with similar means for adjustably connecting it to the screen 37. The other end of the screen 37 is supported by a lever pivoted to the side of the tank at 58 and connected to the screen in the way already described in connection with the lever pivoted at 38. Similar levers are provided for the other side of the screen.

The tank is supplied with a shelf 60 which is supported by a lever 61 at each end thereof. These levers are provided with a plurality of holes 62 by which the height of the shelf 60 may be adjusted. A pin projecting from the side of the tank may be engaged in any one of these holes. The position of the shelf 60 may be altered horizontally by tilting the lever 61 about the pin. Preferably, the engagement between the lever and the side of the tank has sufficient friction to hold the shelf in the position selected but, if desired, the pin may be supplied with a locking nut. When the proper position of the screen 36 has been determined, the shelf 60 is so adjusted that it is slightly below the down-stream end of the screen 36 and projects a little way under this end even when the screen is in its most remote position as it swings.

A shelf 63 similarly supported at each end by a lever 64 adjustably secured in the same way to the side of the tank is provided adjacent to and slightly above the up-stream end of the screen 37.

The portion of the tank 22 containing the screens 36 and 37 and the shelves 60 and 63 is made deeper than the rest of the tank by being provided with converging bottom walls 67 and 68 which lead to a trough 69 crossing the tank. In the trough 69 is located a screw conveyor 70 which is driven by a sprocket 71 which leads to a sprocket wheel upon the shaft 55 and so receives power from the motor 21. This screw conveyor delivers into the outlet 73 which passing beneath the edge of the side wall of the tank turns sharply upwards and contains a conveyor 74 of the bucket type by which the material is lifted above the height of the water and delivered to any desired point.

At the side of the tank adjacent the outlet 23, the top of the end wall of the tank is turned down as illustrated at 75 so that the free surface of the water does not extend horizontally to the right as shown in Figure 2 as far as the outlet.

In the operation of the devices, ashes are delivered intermittently, for example by cart loads, to the hopper 10. Descending this hopper, it is received in the trough 11 and moved toward the right in Figure 4 by the conveyor 12. When the supply of ashes is enough to fill the space between the turns of this conveyor high, the ashes will fall over the edge of the trough 11 near the hopper 10 of the conveyor. As the supply of ashes diminishes, so that the space between the turns of the screw conveyor is not filled so high, the ashes must travel further in order to pass over the edge of the trough. When the supply of ashes is scanty so that the space between the turns of the conveyor is nearly empty, the ashes must travel over the whole length of the trough 11 before it emerges. In each of these cases, the portion of the ashes which is not above the top of the side of the trough 11 is carried further to the right in Figure 4 and so is brought above the top of some lower part of the side of the trough. In this way, the intermittent delivery of ashes into the hopper is converted into a uniformly distributed delivery in the box 14 above the bins.

The restricted outlets 16 of the bins permit them to become partly filled with ashes so that, when the delivery from the trough 11 is slower or ceases, the ashes stored up in the bins will continue to flow out from the outlets 16 and, when the delivery from the trough 11 is more rapid than the flow out of the spouts 16, the storage capacity of the upper and larger portions of the bins 15 or the storage capacity of the rectangular receiver 14 will accommodate the surplus. In this way, a steady flow of ashes out of the spouts 16 unto the belt 17 is obtained. On the belt 17, the several streams of ashes from the spouts 16 spread out and mingle and then fall from the delivery end of this belt into the water in the tank in a wide sheet of fairly uniform thickness.

The extremely fine and light portions of the ashes will float upon the surface of the water and be moved by the current to the right in Figure 2. The most of the ashes will be received upon the screen 36. The oscillation of this screen by the pitman 43 assists the current in moving the ashes toward the right in Figure 2. In order that this motion shall not be too rapid, the adjustment of the screen 36 is preferably such that it slopes upward and down-stream but the holes 45 and 46 are preferably extended far enough to enable the screen to be horizontal or even to slope down and down-stream, if desired. The slope of the screen is adjusted according to the characteristics of the ashes being treated.

As the screen is oscillated, all tendency of the flexible material of the screen itself to buckle under the thrust from the pitman is circumvented by the reinforcing action of the links 44. Also the adjustment by means of the holes 39 enables the attachment of the lever pivoted at 38 to the screen to strictly correspond to the adjustment selected in placing the pin 47 in the holes 45 and 46 so that no distortion of the screen need be produced when changing the adjustment.

The ashes after they have passed over the screen 36 are received upon the shelf 60. Oscillating motion of the screen 36 cannot impart a thrust to the ashes sufficient to drive any particles of them over the entire width of the shelf 60 so that when the ashes reach the down-stream edge of the shelf 60, they are moving under the influence of the current alone. The shelf 60 does, however, have a small down-stream slope from edge to edge so that gravity can slightly assist the action of the current.

When the material reaches the down-stream edge of the shelf 60, it falls through the moving water. The heavier portions of this material will fall more rapidly than the lighter portions. The lighter portions, therefore will be carried down-stream farther during their fall than are the heavier portions. They will therefore arrive at the shelf 63 while the heavier portions will pass by this shelf and descend to the bottom of the tank. The material sifted out by the screen 36 also falls through the water and descends to the bottom of the tank.

From the shelf 63, the material passes in a similar way over the screen 37 and whatever fine material has not already been sifted out will be removed by this screen and will join the other material at the bottom of the tank.

The material accumulated at the bottom of the tank consists, therefore, of all particles of ashes, fine enough to pass through the screens 36 and 37 or heavy enough to fall past the shelf 63. In ashes of the ordinary composition, this would mean that the dust and the clinker arrive at the bottom of the tank while the coke arrives at the outlet 23, the dust, of course, being in the form of mud because it has been mingled with the water. The mud and clinker are removed by the screw conveyor 70 and delivered by the conveyor 74.

A little of the very finest dust will not descend into the water at all but will float upon the surface and reach the sloping wall 75 under the influence of the current. Also many of the finer particles of coke will arrive at this point without having been below the surface of the water and so without having been passed over the screens 36 and 37. The material which arrives at the wall 75 will be sucked into the outlet 23 by the current and delivered along with the material which is passed over the screens 36 and 37 to the pump 26. This material will consist almost entirely of coke but will have with it a small portion of fine dust which by the time it is delivered from the pump will have been thoroughly mingled with water and so will no longer tend to float.

This mixture is delivered upon the screen 30 which preferably is of finer mesh than the screens 36 and 37. As the mixture emerges from the spout 29, no matter how much splashing results, none of it will pass around the end of the screen 30 but it will all be strained thereby because the bevel plate 33 receives all the splashes which tend in this direction and returns them onto the screen. The dust and a very small percentage of coke will pass through this screen and be returned by the apron 32 to the tank where the dust will now promptly descend to the bottom but the coke will descend much more slowly and most of it will arrive at the upper side of the screen 36 where it will mingle with the newly arriving supply of untreated ashes. The screen 30 will deliver the redeemed coke to whatever receptacle is provided for it.

I am aware that numerous details of construction may be varied through a wide range without departing from the principles of this invention, and I therefore do not purpose limiting the patent granted otherwise than necessitated by the prior art.

I claim as my invention:

In a device of the class described, a hopper shaped tank, a centrifugal pump having its inlet connected to one side of said tank, a screen adjacent the other side of the tank adapted to receive the discharge from said pump, means for returning water passing through the screen to said tank, means for introducing material to be separated into the tank on the same side as said screen and means within the tank for restricting the fall of such material through the water to allow the lowest specific gravity constituents thereof to be withdrawn by said pump, the portion so withdrawn including the larger particles of such constituents in the material treated.

In testimony whereof I have hereunto subscribed my name.

JOHN B. ARPIN.